(12) United States Patent
Ajichi et al.

(10) Patent No.: US 7,796,209 B2
(45) Date of Patent: Sep. 14, 2010

(54) ILLUMINATION DEVICE AND LIQUID CRYSTAL DISPLAY DEVICE

(75) Inventors: Yuhsaku Ajichi, Osaka (JP); Takeshi Masuda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/532,906

(22) PCT Filed: Jul. 2, 2008

(86) PCT No.: PCT/JP2008/061965
§ 371 (c)(1),
(2), (4) Date: Sep. 24, 2009

(87) PCT Pub. No.: WO2009/016910
PCT Pub. Date: Feb. 5, 2009

(65) Prior Publication Data
US 2010/0103343 A1   Apr. 29, 2010

(30) Foreign Application Priority Data
Jul. 27, 2007   (JP) .............................. 2007-196668

(51) Int. Cl.
*G02F 1/1335*   (2006.01)
(52) U.S. Cl. .............................. 349/61; 349/56; 349/62; 349/64; 385/901
(58) Field of Classification Search .................... 349/56, 349/61, 62, 64; 385/901
See application file for complete search history.

(56) References Cited

U.S. PATENT DOCUMENTS 6,241,358 B1   6/2001   Higuchi et al.
6,985,131 B2 *   1/2006   Kawada et al. .............. 345/102
7,604,387 B2 *   10/2009   Liu .............................. 362/606
2001/0017774 A1   8/2001   Ho et al.
2002/0197051 A1   12/2002   Tamura et al.
2006/0245213 A1   11/2006   Beil et al.

FOREIGN PATENT DOCUMENTS

JP   2006-134748   5/2006
JP   2006-269364   10/2006

OTHER PUBLICATIONS

International Search Report for PCT/JP2008/061965 mailed Sep. 16, 2008.

* cited by examiner

*Primary Examiner*—Jennifer Doan
(74) *Attorney, Agent, or Firm*—Nixon & Vanderhye, P.C.

(57) ABSTRACT

A backlight (2; illumination device) includes multiple light guide units (11) each including: a light source (5); and a light guide plate (7) for diffusing, for surface emission, light from the light source (5). Each light guide plate (7, 7 . . . ) includes: a light-emitting section (7b) having a light-emitting surface (7a); and a light guide section (7c) for guiding, to the light-emitting section, light from the light source (5), a light-emitting section (7b) of one of any adjacent two of the light guide plates (7) being provided above a light guide section (7c) of the other light guide plate (7). The light-emitting surface (7a) includes: a parallel surface (7d) parallel to an irradiation object; and a slant surface (7e) slanted relative to the irradiation object, the slant surface being provided between the parallel surface (7d) and the light guide section (7c); and the slant surface (7e) has gradients varying continuously relative to the parallel surface (7d) in such a manner as to form a curved surface continuously connecting with the parallel surface. This allows for production of an illumination device capable of achieving better uniformity in light emitted from its light sources.

4 Claims, 5 Drawing Sheets

ILLUMINATION DEVICE AND LIQUID CRYSTAL DISPLAY DEVICE

This application is the U.S. national phase of International Application No. PCT/JP2008/061965 filed 2 Jul. 2008 which designated the U.S. and claims priority to Japanese Patent Application No. 2007-196668 flied 27 Jul. 2007, the entire contents of each of which are hereby incorporated by reference.

TECHNICAL FIELD

The present invention relates to an illumination device used, for example, as a backlight of a liquid crystal display device, and also relates to a liquid crystal display device including the illumination device.

BACKGROUND ART

Liquid crystal display devices have become rapidly popular in place of cathode ray tube (CRT) based display devices in recent years. The liquid crystal display devices have been in widespread use in liquid crystal televisions, monitors, mobile phones, and the like, which take advantage of, e.g., energy saving, thin, and lightweight features of the liquid crystal display devices. One way to further take advantage of such features is to improve an illumination device (i.e., a so-called backlight) which is provided behind the liquid crystal display device.

The illumination devices are roughly classified into a side light type (also referred to as an edge light type) and a direct type. The side light type is configured such that a light guide is provided behind a liquid crystal display panel and that a light source is provided at a lateral edge of the light guide. Light emitted from the light source is reflected by the light guide, so as to irradiate the liquid crystal display panel indirectly and uniformly. With this configuration, it is possible to realize an illumination device which has a reduced thickness and excellent luminance uniformity, although its luminance is low. For this reason, the side light type illumination device is mainly used in medium- to small-size liquid crystal displays such as a mobile phone and a laptop personal computer.

One example of the side light type illumination device is the one disclosed in Patent Literature 1. Patent Literature 1 discloses a surface-emitting device in which a reflecting surface of a light guide plate is provided with a plurality of dots for the purpose of allowing for uniform light emission from a light-emitting surface. In this surface-emitting device, light is not transmitted to a corner section of the reflecting surface due to directivity of a light source, and thereby the corner section of the reflecting surface is darkened. In order to deal with this, the corner section has a higher dot-density compared with other sections.

The direct type illumination device is provided with a plurality of light sources aligned behind a liquid crystal display panel, so as to directly irradiate the liquid crystal display panel. This makes it easier to obtain a high luminance even with a large screen. On this account, the direct type illumination device is mainly employed in a large liquid crystal display of 20 inches or more. However, a currently available direct type illumination device has a thickness of as much as approximately 20 mm to approximately 40 mm, and this becomes an obstacle to a further reduction in a thickness of the display.

The further reduction in the thickness of the large liquid crystal display can be achieved by shortening a distance between the light source and the liquid crystal display panel. In this case, however, it is impossible for the illumination device to achieve luminance uniformity unless the number of light sources is increased. However, increasing the number of light sources increases a cost. In view of this, there is a need for developing an illumination device which is thin and has excellent luminance uniformity, without increasing the number of light sources.

Conventionally, in order to solve these problems, such an attempt has been conducted that a plurality of side light type illumination devices are aligned and thereby the thickness of the large liquid crystal display is reduced.

Patent Literature 2, for example, discloses a surface light source device including light guide blocks each in a shape of a plate, the light guide blocks overlapping one another for a tandem arrangement, and primary light sources each supplying primary light to a corresponding one of the light guide blocks. This arrangement allows a large light-emitting area to be secured with a compact structure. Thus, the surface light source device is suitably applicable to a large liquid crystal display.

Patent Literature 3 discloses an illumination device including an arrangement of multiple light-emitting modules each in a shape of a polygon. The light-emitting modules each include: a light-emitting body; and a light source such as an LED provided at an end section of the light-emitting body.

An illumination device configured, as described above, such that a plurality of light guide units each of which is made by a combination of a light source and a light guide are aligned is called a tandem type illumination device.

CITATION LIST

Patent Literature 1
Japanese Patent Application Publication, Tokukai, No. 2003-43266 (Publication Date: Feb. 13, 2003)
Patent Literature 2
Japanese Patent Application Publication, Tokukaihei, No. 11-288611 (Publication Date: Oct. 19, 1999)
Patent Literature 3
Japanese Patent Application Publication (Translation of PCT Application), Tokuhyo, No. 2006-522436 (Publication Date: Sep. 28, 2006)
Patent Literature 4
Japanese Patent Application Publication, Tokukai, No. 2001-31 2916 (Publication Date: Nov. 9, 2001)

SUMMARY OF INVENTION

Since the above tandem-type illumination devices each have a light-emitting surface formed of individual light guide plates, bright lines and shadows occur along a boundary between the light guide plates. This unfortunately causes luminance unevenness.

In order to solve this problem, Patent Literature 4 discloses a so-called tandem-type surface light source device including separate light guide plates, each of the light guide plates having an end surface that is not vertical, but so slanted that an upper side of the end surface projects further outwards (see Patent Literature 4, FIGS. 10 and 12).

However, when the end surface of each light guide plate is slanted as described above, any other light guide plate above which the end surface is placed has its light-emitting surface having a portion that has a sharp gradient difference. Such a portion that has a sharp gradient difference still problematically impairs luminance uniformity in a complete light-emitting surface.

The following describes this problem with reference to FIG. 5. FIG. 5 partially illustrates a configuration of a light guide unit 31 included in a conventional illumination device. The light guide unit 31 includes a light guide plate 37 and a light source 35.

The light guide plate 37 shown in FIG. 5 includes: a light-emitting section 37b having a light-emitting surface 37a; and a light guide section 37c for guiding, to the light-emitting section 37b, light from the light source 35. The light-emitting surface 37a formed in the light-emitting section 37b includes: a parallel surface 37d parallel to an irradiation object such as a liquid crystal panel; and a slant surface 37e connecting the parallel surface 37d and a front surface of the light guide section 37c. FIG. 5 shows with arrows having dashed lines optical paths in a region A, i.e., a region including a boundary between the slant surface 37e and the parallel surface 37d and the vicinity of the boundary.

As shown in FIG. 5, a surface in the region A, the surface having a sharp gradient difference, causes a sharp difference in the optical paths and consequently causes two distinct types of light. When the light-emitting surface is viewed from a certain angle, such a region having optical paths having a sharp difference is observed as having a luminance different from a luminance in a region surrounding the above region. A smooth variation in the optical paths would result in a smooth variation in the luminance. However, a sharp difference in the optical paths results in a sharp difference in the luminance. This causes luminance unevenness. Thus, the region A in the light-emitting surface 37a causes luminance unevenness, thereby impairing luminance uniformity.

The present invention has been accomplished in view of the above problem. It is an object of the present invention to provide an illumination device capable of achieving better uniformity in emitting light from its light sources.

In order to solve the above problem, an illumination device of the present invention includes: a plurality of pairs of a light source and a light guide plate, the light guide plate receiving light from the light source, diffusing the light, and performing surface emission of the light, the light guide plate including: a light-emitting section having a light-emitting surface from which the light is emitted; and a light guide section for guiding, to the light-emitting section, the light from the light source, the light guide plates being adjacent to one another in such a manner that a light-emitting section of one light guide plate on one side is disposed on a light guide section of a light guide plate adjacent thereto on the other side, wherein: the light-emitting surface includes: a parallel surface parallel to an irradiation object; and a slant surface slanted relative to the irradiation object, the slant surface being provided between the parallel surface and the light guide section of the light guide plate; and the slant surface has gradients varying continuously relative to the parallel surface in such a manner as to form a curved surface continuously connected with the parallel surface.

The above arrangement includes a slant surface between the parallel surface and the light guide section. This prevents luminance unevenness in the light-emitting surface. Further, the slant surface has gradients varying continuously relative to the parallel surface in such a manner as to form a curved surface continuously connecting with the parallel surface. This prevents a sharp difference between optical paths of light emitted from the slant surface and those of light emitted from the parallel surface. This further prevents luminance unevenness in the complete light-emitting surface and thereby allows for production of an illumination device having further improved luminance uniformity.

The illumination device of the present invention may preferably be arranged such that the light-emitting surface is so shaped along a boundary between the parallel surface and the slant surface that the light from the light-emitting surface is emitted at angles varying smoothly across the boundary.

According to the above arrangement, the light-emitting surface is so shaped along the boundary between the parallel surface and the slant surface that light from the light-emitting surface is emitted at angles varying smoothly across the boundary. This further prevents luminance unevenness in the light-emitting surface.

In other words, the light-emitting surface being so shaped along the boundary between the parallel surface and the slant surface eliminates a portion between the parallel surface and the slant surface, the portion having a sharp gradient difference. This prevents a sharp difference in the optical paths of light from the light guide plate. This in turn further prevents luminance unevenness in the complete light-emitting surface and allows for production of an illumination device having further improved luminance uniformity.

The illumination device of the present invention may preferably be arranged such that the slant surface has gradients along a boundary between the slant surface and a front surface of the light guide section of the light guide plate, the gradients varying continuously relative to the front surface in such a manner that the slant surface is a curved surface continuously connected with the front surface.

The above arrangement allows light from a region including the boundary between the slant surface and the light guide section and the vicinity of the boundary to be emitted at angles varying smoothly. This allows the illumination device to have further improved luminance uniformity. A tolerance caused in actual use may result in light emitted from the light guide section. Thus, the slant surface preferably includes a curved surface along the boundary between the front surface of the light guide section and the slant surface as described above.

A liquid crystal display device of the present invention includes any of the above the illumination devices as a backlight.

The liquid crystal display device of the present invention includes an illumination device of the present invention as its backlight. This allows for uniform light emission onto a liquid crystal display panel and therefore improves display quality.

Additional objects, features, and strengths of the present invention will be made clear by the description below. Further, the advantages of the present invention will be evident from the following explanation in reference to the drawings.

BRIEF DESCRIPTION OF DRAWINGS

FIG. 1 is a cross-section view partially illustrating a configuration of a light guide unit included in a backlight of a liquid crystal display device shown in FIG. 2.

FIG. 2 is a cross-section view illustrating a configuration of the liquid crystal display device in accordance with an embodiment of the present invention.

FIG. 3 is a perspective view illustrating the configuration of the light guide unit included in the backlight of the liquid crystal display device shown in FIG. 2

FIG. 4 is a partial cross-section view illustrating a configuration of another example of a light guide unit included in the backlight of the liquid crystal display device of the present invention.

FIG. 5 is a partial cross-section view illustrating a configuration of a light guide unit included in a conventional backlight.

REFERENCE SIGNS LIST

Figure 1:
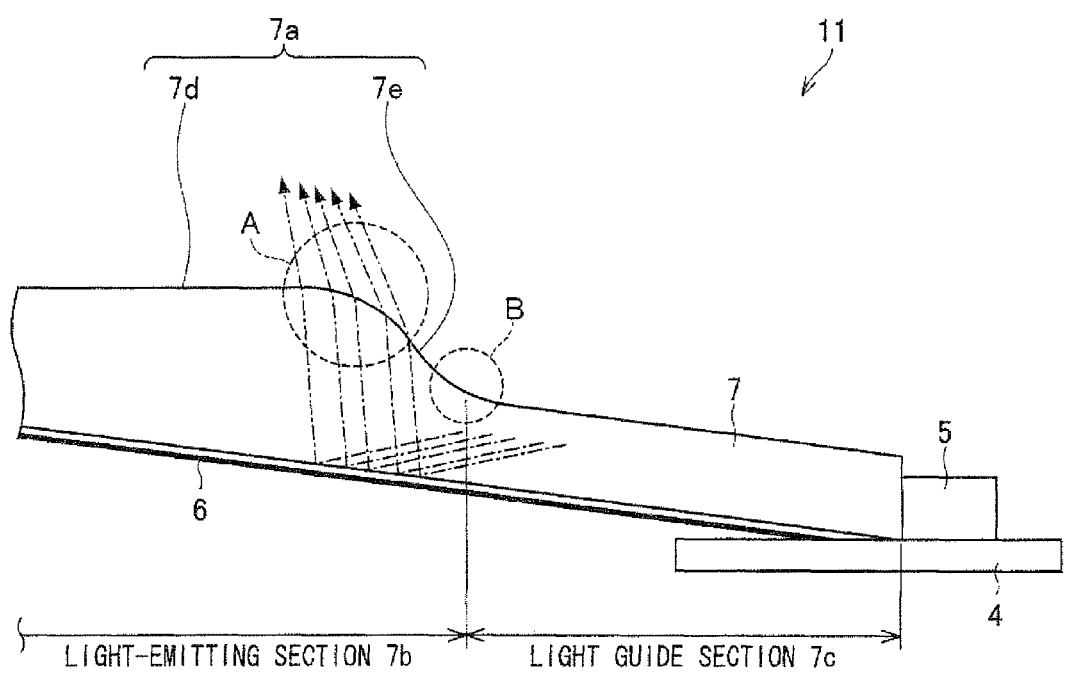
FIG. 1

1 Liquid crystal display device
2 Backlight (Illumination device)
3 Liquid crystal display panel
5 Light source
6 Reflecting sheet
7 Light guide plate
7a Light-emitting surface
7b Light-emitting section
7c Light guide section
7d parallel surface
7e slant surface
8 Optical sheet
11 Light guide unit
51 Light guide unit

DESCRIPTION OF EMBODIMENTS

An embodiment of the present invention is described below with reference to FIGS. 1 through 4. Note that the present invention is not limited to this.

The present embodiment describes an illumination device used as a backlight of a liquid crystal display device.

FIG. 1 is a cross-section view schematically illustrating a configuration of a liquid crystal display device 1 according to the present embodiment. The liquid crystal display device 1 includes: a backlight 2 (illumination device); and a liquid crystal display panel 3 so provided as to face the backlight 2.

The liquid crystal display panel 3 is similar to a liquid crystal display panel generally used in a conventional liquid crystal display device. For example, the liquid crystal display panel 3 is so configured as to include: an active matrix substrate on which a plurality of thin film transistors (TFTs) are formed; a CF substrate facing the active matrix substrate; and a liquid crystal layer sealed between the active matrix substrate and the CF substrate by means of a sealing material (all of which are not shown in FIG. 1).

The following describes a configuration of the backlight 2 provided in the liquid crystal display device 1.

Figure 2:
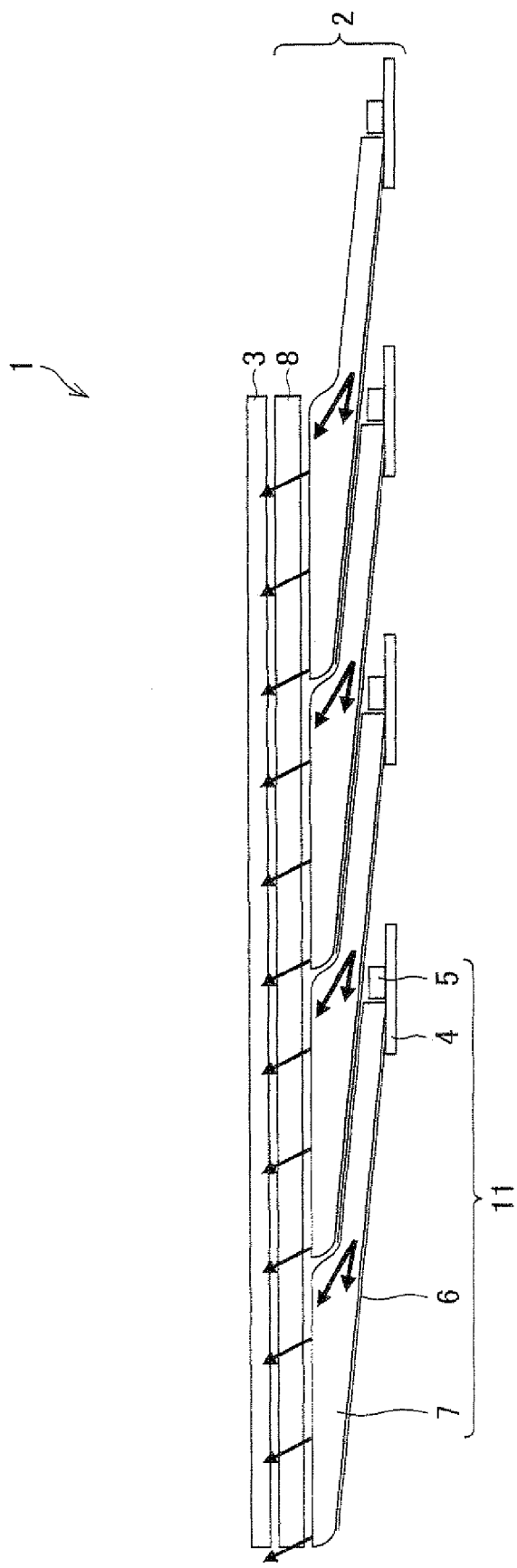
FIG. 2

As shown in FIG. 2, the backlight 2 is disposed behind the liquid crystal display panel 3 (i.e., facing a surface opposite from a display surface). The backlight 2 includes multiple light guide units 11 each including a combination of a light source 5 and a light guide plate 7.

Figure 3:
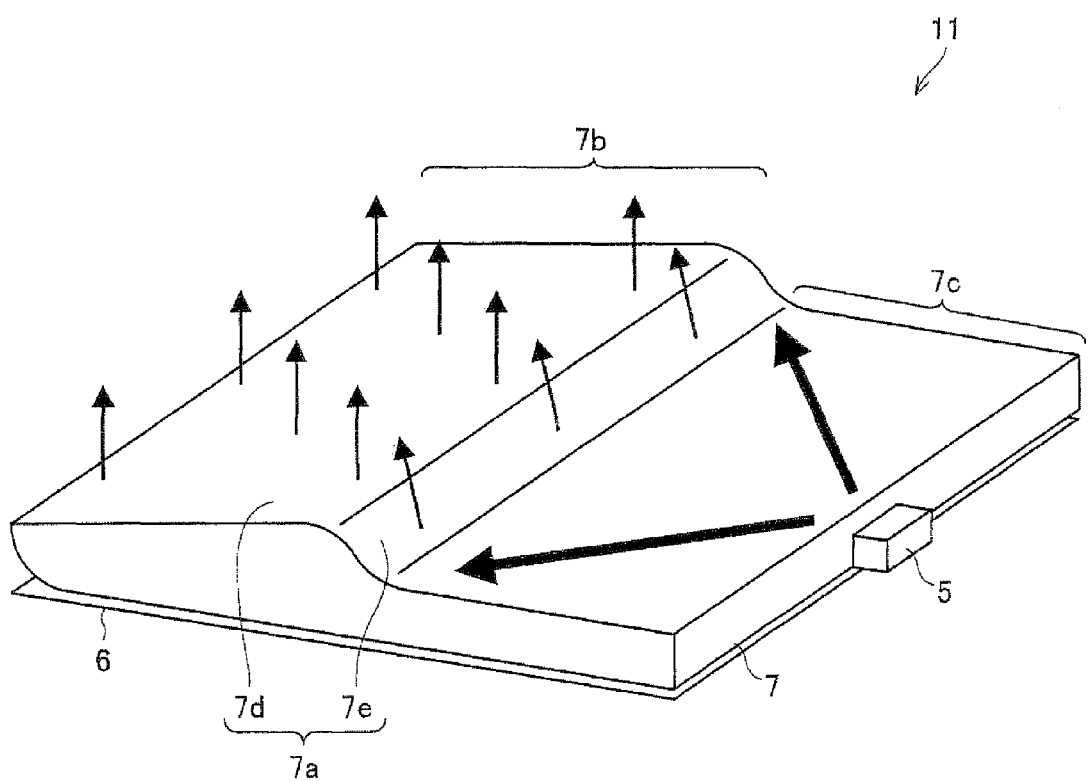
FIG. 3

The following describes a structure of the light guide units 11 with reference to FIGS. 1 and 3. Each light guide unit 11 includes: a light source 5; a light guide plate 7 for diffusing light from the light source 5 to emit in a form of plane emission of the light; a substrate 4 on which the light source 5 is provided; and a reflecting sheet 6.

The light sources 5 are each, for example, a side light-emitting type light-emitting diode (LED) or a cold cathode fluorescent lamp (CCFL). The present embodiment deals with, as one example, LEDs as the light sources 5. By using, as the light sources 5, the side light-emitting type LEDs each including chips of R, G, and B molded into one package, it is possible to achieve an illumination device capable of a wide range of color reproduction. Note that the light sources 5 are each provided on its corresponding substrate 4.

The light guide plates 7 each cause surface emission of light from its light-emitting surface (referred to also as "light emission surface") 7a, the light having been emitted from its corresponding light source 5. The light-emitting surface 7a is a surface for emitting light toward an irradiation object. In the present embodiment, the light guide plates 7 employ a tandem configuration as shown in FIG. 2. That is, the light guide plates 7 are arranged such that: (i) each light guide plate 7 includes (a) a light-emitting section 7b including the light-emitting surface 7a and (b) a light guide section 7c for directing, to the light-emitting section 7b, light emitted from the corresponding light source 5; and (ii) the light-emitting section 7b of a first light guide plate 7 is placed on the light guide section 7c of a second light guide plate 7. The arrangement as described above is referred to as a tandem arrangement.

FIG. 2 is a perspective view schematically illustrating a configuration of a light guide unit 11 included in the liquid crystal display device 1 shown in FIG. 1. As shown in FIG. 2, light emitted from the light source 5 enters the light guide section 7c of the light guide plate 7. The light is then transmitted through the light guide section 7c, and reaches the light-emitting section 7b. A front surface (light-emitting surface 7a) or a back surface of the light-emitting section 7b of the light guide plate 7 has been subjected to a process or a treatment (not shown) each of which is for causing light which has been guided thereto to be emitted toward the front surface. Thereby, the light is emitted from the light-emitting surface 7a of the light guide plate 7 toward the liquid crystal display panel 3. Examples of a specific method for the process or the treatment applied to the light-emitting section 7b of the light guide plate 7 encompass prism processing, texturing, and print processing. However, the method is not particularly limited, and may be a publicly known method as needed.

Further, the light guide plate 7 is mainly made from a transparent resin such as a PMMA or a polycarbonate. However, the material is not particularly limited, but may preferably be a material having a high light transmittance.

Further, the light guide plate 7 may be formed by means of, for example, injection molding or extrusion molding, hot-press molding, or cutting. However, the molding method used in the present invention is not particularly limited to these, and may be any processing method as long as it achieves a similar property.

The reflecting sheets 6 are each provided in contact with the back surface (a surface opposite to the light-emitting surface 7a) of the corresponding light guide plate 7. The reflecting sheets 6 each reflect light so as to allow the corresponding light-emitting surface 7a to emit a larger amount of light.

The backlight 2 further includes on a back surface of each substrate 4 (i.e., a surface opposite from a surface on which a corresponding light source 5 is mounted) a driver (not shown) for controlling lighting of an LED included in the light source 5. In other words, the driver is mounted on the same substrate 4 on which the LED is mounted. Mounting the driver and the LED on the same substrate allows for reduction in the number of substrates as well as, e.g., connectors connecting substrates. This consequently allows for reduction of cost of producing the illumination device. In addition, the reduction in the number of substrates in turn allows for reduction in thickness of the backlight 2.

As shown in FIG. 2, the backlight 2 also includes an optical sheet 8 above the multiple light guide units 11 having a tandem arrangement as described above. The optical sheet 8 includes any one or any suitable combination of: a diffusing plate used to emit uniform light onto the liquid crystal display panel 3; a diffusing sheet for simultaneously focusing and diffusing light; a lens sheet for focusing light so as to improve luminance in a front direction; and a polarizing and reflecting sheet for reflecting a polarized component of light having a particular vibration pattern and transmitting other polarized components having other vibration patterns so as to improve luminance of the liquid crystal display device 1. An arrangement of the optical sheet 8 may be determined in accordance with an intended price and/or performance of the liquid crystal display device 1.

The above arrangement causes light from each of the dot-shaped light sources 5 to travel through a corresponding light guide plate 7 while being diffused and reflected, and then to emit from a corresponding light-emitting surface 7a. FIGS. 2 and 3 show traveling directions of light with arrows.

The light emitted from the light-emitting surface 7a is then diffused by the optical sheet 8 provided in front of the light guide plate 7, so that the light is uniformed and condensed. The light is then emitted onto the liquid crystal display panel 3.

The following describes in more detail the structure of the light guide units 11 included in the backlight 2 of the present invention, in comparison with a structure of a conventional light guide unit 31.

Figure 5:
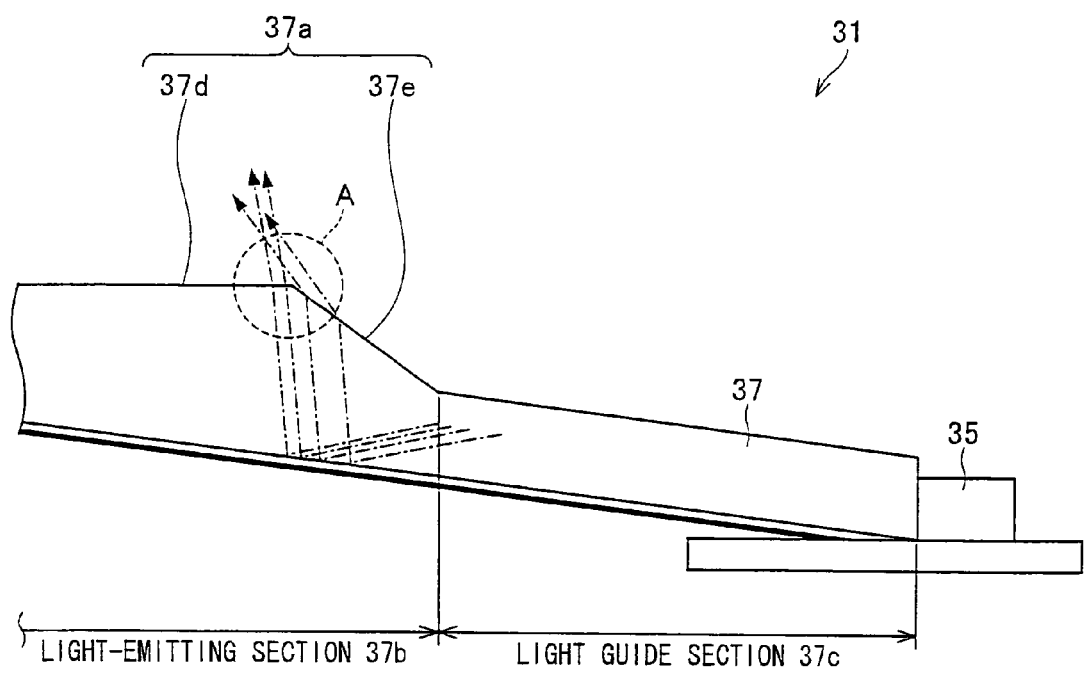
FIG. 5

FIG. 5 is a partial cross-section view illustrating a configuration of the conventional light guide unit 31. As described above, the light-emitting surface 37a formed in the light-emitting section 37b includes: a parallel surface 37d parallel to an irradiation object such as a liquid crystal panel; and a slant surface 37e connecting the parallel surface 37d and the front surface of the light guide section 37c.

Each of the light guide units 11 of the present embodiment includes, as in the light guide unit 31, a light-emitting section 7b having a light-emitting surface 7a that includes a parallel surface 7d parallel to an irradiation object, i.e., the liquid crystal panel 3; and a slant surface 7e connecting the parallel surface 7d and a front surface of the light guide section 7c. The light guide section 7e is connected to the light-emitting section 7b not by a surface perpendicular to the parallel surface, but by the slant surface 7e mentioned above. This prevents a shadow (i.e., a dark line) caused, by lack of light incident from a corresponding light source, in a portion of the light-emitting surface 7a, the portion being close to the boundary between the light-emitting surface 7a and the light guide section 7c. This consequently prevents luminance unevenness in the complete light-emitting surface of the backlight 2, the light-emitting surface being formed by arranging the individual light guide plates 7.

However, the provision of the slant surface mentioned above still problematically prevents surface luminance uniformity in the conventional light guide unit 31. This is because there is a sharp difference between a gradient of the slant surface 37e and a gradient of the parallel surface 37d.

The arrows having dashed lines shown in FIG. 5 represent optical paths of light from the light source 35 in a region A, i.e., a region including the boundary between the slant surface 37e and the parallel surface 37d and the vicinity of the boundary. As shown in FIG. 5, a surface in the region A, the surface having a sharp gradient difference (i.e., a discontinuous surface formed of the slant surface 37e and the parallel surface 37d), causes a sharp difference in the optical paths, thereby causing two distinct types of light. Thus, the region A in the light-emitting surface 37a causes luminance unevenness, thereby impairing luminance uniformity.

In contrast, each light guide unit 11 of the present invention includes a slant surface 7e that has gradients varying continuously relative to the parallel surface 7d in such a manner as to form a curved surface continuously connecting with the parallel surface 7d.

More specifically, the light-emitting section 7b of each light guide unit 11 has a rear end (i.e., the end that is closer to the light guide section 7c than the other end is) that smoothly connects the front surface of the light guide section 7c to the parallel surface 7d of the light-emitting section 7b. The term "smoothly" as used herein means "with no discontinuity".

The slant surface 7e being a curved surface as described above prevents a sharp difference between optical paths for light emitted from the slant surface 7e and those for light emitted from the parallel surface 7d. This further prevents luminance unevenness in the complete light-emitting surface 7a and in turn allows for production of a backlight 2 having further improved luminance uniformity.

More specifically, the above curved surface is so shaped that light from the light-emitting surface 7a is emitted at angles varying smoothly across the boundary between the parallel surface 7d and the slant surface 7e. The phrase "light from a light guide plate is emitted at angles varying smoothly" as used herein indicates that, when light travels through the light guide plate in the same direction toward the parallel surface and the slant surface, light from the parallel surface and the slant surface is emitted at least at three different angles relative to the parallel surface.

The above arrangement prevents a sharp gradient difference between the slant surface and the parallel surface, and consequently prevents a large difference in the optical paths for light from the light guide plate. This further prevents luminance unevenness in the complete light-emitting surface and in turn allows for production of a backlight having further improved luminance uniformity.

The arrows having dashed lines shown in FIG. 1 represent optical paths of light from the light source 5 in a region A, i.e., a region including the boundary between the slant surface 7e and the parallel surface 7d and the vicinity of the boundary. As shown in FIG. 1, according to each light guide unit 11 of the present embodiment, light from the light guide plate 7 is emitted in the region A at angles relative to the parallel surface, the angles varying gradually from the slant surface 7e toward the parallel surface 7d.

As described above, each light guide unit 11 of the present embodiment causes no discontinuity in the luminance variation of its emitting light. This allows uniform emission of light from the light-emitting surface 7a.

In addition, each light guide unit 11 of the present embodiment includes a curved surface as in the region A in a region (region B of FIG. 1) including a boundary between the slant surface 7e and the front surface of the light guide section 7c and the vicinity of the boundary. More specifically, the slant surface 7e is so curved along the boundary between the slant surface 7e and the front surface of the light guide section 7c as to have gradients varying continuously relative to the front surface of the light guide section 7c in such a manner that the slant surface 7e continuously connects with the front surface of the light guide section 7c. This further achieves a smooth variation in the gradients of light emitted from the region including the boundary between the slant surface 7e and the light guide section and the vicinity of the boundary. This consequently further improves luminance uniformity of the backlight 2.

Figure 4:
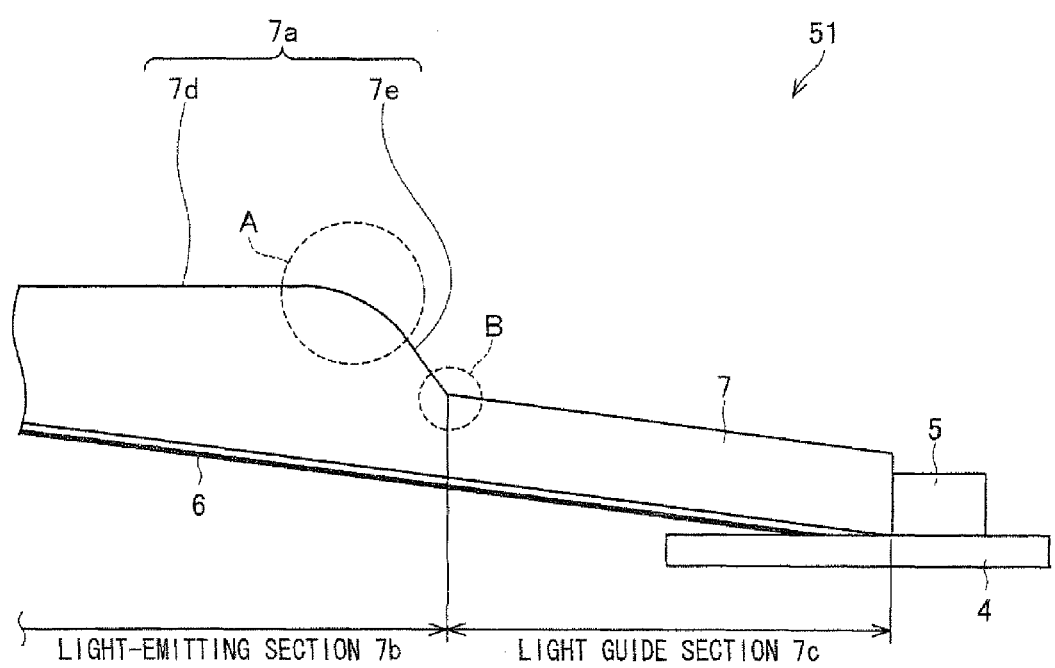
FIG. 4

Note that the light guide unit of the present invention is not necessarily limited to a light guide unit having the above arrangement. FIG. 4 illustrates a structure of another example of a light guide unit according to the present invention. Same members of the light guide unit 51 shown in FIG. 4 as those of the light guide unit 11 described above are assigned the same reference numerals and the description of the members is omitted.

As shown in FIG. 4, the light guide unit 51 includes a slant surface 7e that has gradients varying continuously relative to the parallel surface 7d in a region (region A of FIG. 4) including the boundary between the parallel surface 7d and the slant surface 7e and the vicinity of the boundary, so that the slant surface 7e is a curved surface continuously connecting with the parallel surface 7d.

In contrast, the light guide unit 51 includes no curved surface as described above in a region (region B of FIG. 4) including the boundary between the slant surface 7e and the front surface of the light guide section 7c. Thus, the region B has a discontinuous surface formed of two surfaces connected to each other. The region B does not necessarily have a curved surface as mentioned above because another light guide unit is so disposed above the region B that the region B is not exposed. Thus, the region B not having a curved surface does not pose a major problem with surface luminance uniformity.

However, in order to further improve luminance uniformity of the backlight, both the region A and the region B each preferably have a curved surface as in the light guide unit 11 of FIG. 1. Light changes its traveling direction when the light-emitting surface 7a includes a singular point as in a rectangle, not only along the boundary between the front surface of the light guide section 7c and the slant surface 7e, but also anywhere else throughout the light-emitting surface 7a. A surface having a singular point as mentioned above causes a sharp luminance difference when light is emitted from such a surface. Therefore, the light-emitting surface 7a is preferably smooth throughout.

As described above, because the liquid crystal display device 1 of the present embodiment includes the backlight 2 as described above, the liquid crystal display device 1 can emit more uniform light to the liquid crystal display panel 3, thereby improving display quality.

The above embodiment uses LEDs as the light sources 5 as an example. However, the light sources of the present invention are not limited to LEDs and may therefore be other light sources. Examples of such other light sources encompass cold cathode fluorescent lamps (CCFLs).

As described above, an illumination device of the present invention includes a slant surface between the parallel surface and the light guide section. This prevents luminance unevenness in the light-emitting surface. Further, the slant surface has gradients varying continuously relative to the parallel surface in such a manner as to form a curved surface continuously connecting with the parallel surface. This prevents a sharp difference between optical paths of light emitted from the slant surface and those of light emitted from the parallel surface. This further prevents luminance unevenness in the complete light-emitting surface and thereby allows for production of an illumination device having further improved luminance uniformity.

Further, because the illumination device of the present invention has excellent luminance uniformity even in a case where its light-emitting area is large, it is particularly preferable that this illumination device is used as a backlight of a liquid crystal display device having a large screen. However, the present invention is not limited to this, and may be used as a backlight of any liquid crystal display panel.

As described above, the illumination device of the present invention is arranged such that the light-emitting surface includes: a parallel surface parallel to an irradiation object; and a slant surface slanted relative to the irradiation object, the slant surface being provided between the parallel surface and the light guide section of the light guide plate; and the slant surface has gradients varying continuously relative to the parallel surface in such a manner as to form a curved surface continuously connected with the parallel surface.

The above arrangement further prevents luminance unevenness in the complete light-emitting surface and thereby allows for production of an illumination device having further improved luminance uniformity.

As described above, a liquid crystal display device of the present invention includes one of the illumination devices of the present invention as a backlight.

The above arrangement allows light to be emitted more uniformly onto the liquid crystal display panel. This improves display quality.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention allows for production of an illumination device capable of achieving better uniformity in light emitted from its light sources. The illumination device of the present invention is applicable as a backlight of a liquid crystal display device.

The invention claimed is:

1. An illumination device comprising:
a plurality of pairs of a light source and a light guide plate, the light guide plate receiving light from the light source, diffusing the light, and performing surface emission of the light,
the light guide plate including:
a light-emitting section having a light-emitting surface from which the light is emitted; and
a light guide section for guiding, to the light-emitting section, the light from the light source,
the light guide plates being adjacent to one another in such a manner that a light-emitting section of one light guide plate on one side is disposed on a light guide section of a light guide plate adjacent thereto on the other side, wherein:

the light-emitting surface includes:
- a parallel surface parallel to an irradiation object; and
- a slant surface slanted relative to the irradiation object, the slant surface being provided between the parallel surface and the light guide section of the light guide plate; and
- the slant surface has gradients varying continuously relative to the parallel surface in such a manner as to form a curved surface continuously connected with the parallel surface.

2. The illumination device according to claim 1, wherein the light-emitting surface is so shaped along a boundary between the parallel surface and the slant surface that the light from the light-emitting surface is emitted at angles varying smoothly across the boundary.

3. The illumination device according to claim 1, wherein the slant surface has gradients along a boundary between the slant surface and a front surface of the light guide section of the light guide plate, the gradients varying continuously relative to the front surface in such a manner that the slant surface is a curved surface continuously connected with the front surface.

4. A liquid crystal display device comprising as a backlight an illumination device recited in claim 1.

* * * * *